Sept. 26, 1950 J. A. HERBST ET AL 2,523,300

PRINTER TELEGRAPH CIRCUIT

Filed Aug. 17, 1946 6 Sheets-Sheet 1

INVENTORS
JOHN A. HERBST
GILBERT R. CLARK

BY

R. P. Morris
ATTORNEY

Sept. 26, 1950 J. A. HERBST ET AL 2,523,300

PRINTER TELEGRAPH CIRCUIT

Filed Aug. 17, 1946 6 Sheets-Sheet 2

INVENTORS
JOHN A. HERBST
GILBERT R. CLARK

BY

R. P. Morris
ATTORNEY

Sept. 26, 1950 J. A. HERBST ET AL 2,523,300

PRINTER TELEGRAPH CIRCUIT

Filed Aug. 17, 1946 6 Sheets-Sheet 3

INVENTORS
JOHN A. HERBST
GILBERT R. CLARK

BY

R. P. Morris
ATTORNEY

Sept. 26, 1950 J. A. HERBST ET AL 2,523,300

PRINTER TELEGRAPH CIRCUIT

Filed Aug. 17, 1946 6 Sheets-Sheet 4

INVENTORS
JOHN A. HERBST
GILBERT R. CLARK

BY

R. P. Morris
ATTORNEY

Sept. 26, 1950 J. A. HERBST ET AL 2,523,300

PRINTER TELEGRAPH CIRCUIT

Filed Aug. 17, 1946 6 Sheets-Sheet 5

INVENTORS
JOHN A. HERBST
GILBERT R. CLARK
BY
R. P. Morris
ATTORNEY

Sept. 26, 1950 J. A. HERBST ET AL 2,523,300

PRINTER TELEGRAPH CIRCUIT

Filed Aug. 17, 1946 6 Sheets-Sheet 6

INVENTORS
JOHN A. HERBST
GILBERT R. CLARK
BY
R P Morris
ATTORNEY

Patented Sept. 26, 1950 2,523,300

UNITED STATES PATENT OFFICE 2,523,300

PRINTER TELEGRAPH CIRCUIT

John A. Herbst, Pines Lake, and Gilbert R. Clark, Nutley, N. J., assignors to Federal Telephone and Radio Corporation, New York, N. Y., a corporation of Delaware Application August 17, 1946, Serial No. 691,282

5 Claims. (Cl. 178—17.5)

This invention relates to telegraph code communication systems and more particularly to a multiple unit code and apparatus for operating with nine unit symbol indicating systems.

Numerous types of telegraphic code communication systems, particularly for operating printing apparatus, have been proposed. For example, the well known Baudot code system utilizing five units in which the various character combinations may be any number from one to five of these units is in general use. The transmitted units may be indicated by marking and spacing pulses either one or both of which may constitute positive or negative pulses or combinations of pulses of different frequencies particularly when used with radio communication apparatus. One difficulty of the five unit code, however, is that it becomes difficult to detect errors since an additional pulse added or one pulse dropped out of any character transmitted will merely provide for printing a different character instead of the proper one.

One system has been proposed for obviating the possible errors inherent in the five unit code system, utilizing seven character units, only three of which units are marking in any one character, the characters being designated by different arrangements of the marking and spacing pulses. Such a system more readily permits detection of errors since if any number other than three units is received an error marking can be indicated.

According to our invention error protection and security of message is further enhanced over the prior art systems by utilizing a nine unit code wherein nine time division units are provided, two of which are significant for character indication being used in different combinations. Furthermore, transmission of two frequencies is used, one to indicate the two marking impulse positions and another frequency to indicate the other seven or spacing intervals. With such a system, since the division between marking and spacing is nowhere near equality, great security from the fortuitous mutilation of character units so as to produce an undetectable error, is achieved.

Further in accordance with our invention, we have provided transmitter and receiver apparatus for operation on a multiple code system which is particularly useful with such nine unit code and which will provide for relatively secure operation. Furthermore, our telegraph circuit arrangement includes many novel structural features and circuit features which, while particularly useful in the nine unit code system discussed above, are applicable to other systems regardless of the number of code units per character.

In accordance with the above outline it is an object of our invention to provide a code communication system utilizing nine units code with two significant units utilized in nine variable spacing positions in different character combinations.

It is a further object of our invention to provide novel transmitter and/or receiver means for nine unit code operation.

It is another object of our invention to provide a multiple unit code transmission and reception system wherein a fixed number of significant indicating units are used and wherein the significant or marking units are designated by one tone frequency characteristic while the spacing units are designated by a different frequency.

It is a further object of our invention to provide a transmitter or printer telegraph code system wherein condenser storage and read off units utilizing electron discharge means is provided for translation of the transmitted and/or received signal units.

It is a still further object of our invention to provide a novel tele-printer distributing and storage condenser arrangement for transfer of signal energies to gas-filled tube circuits.

It is a still further object of our invention to provide a common transmitter-receiver equipment wherein the same storage and distributor units may be used for both transmission and reception.

It is a still further object of our invention to provide a tele-printer transmitter-receiver apparatus wherein storage of the signals and transfer thereof to the transmitter sequentially operates to produce a local reproduction printing of the transmitted message.

According to a feature of our invention, we provide a communication system preferably for radio frequency operation which operates preferably on a nine unit code principle, the nine units of each character being represented by nine substantially equal time divisions. Marking signals are transmitted for two time units out of the total nine units, these marking signals preferably being designated by a predetermined characteristic such as frequency. The other seven spacing units accompanying each character are preferably designated by a different characteristic preferably a different frequency from the first transmitted.

In the transmitter unit there is provided a key board having thirty six keys, each key producing a combination circuit for the two frequencies to provide two marking spaces with predetermined different spacing time intervals to designate the individual characters. Operation of each character key serves to provide charges on two out of nine storage condensers, which condensers are cyclically traversed by a distributing brush. Passing of the brush over the individual distributor contacts serves to operate a relay so as to transmit marking or spacing signal designating units depending upon the charge provided in the condensers. Preferably the distributor is provided with an auxiliary switch so that after sweeping the distributor contacts the brush will serve to close this switch operating a transfer switch to apply the stored signals to a locally positioned printer so as to print the character transmitted.

For the receiver operation the local switch may be operated disconnecting the transmitter unit and connecting in a receiver unit. The receiver is preferably provided with means selectively to segregate the different tone frequencies and apply voltages corresponding to these frequencies to the same storage condensers over the distributor. Thus, the received significant voltage impulses will be stored on the condensers in accordance with the received character. Provisions are made to maintain synchronism between the transmitted and the receiving distributor, preferably by some control such as tuning fork controls which will assure the same frequency of operation of the motors. Preferably a manual phasing means is provided to adjust the phase of the receiver synchronizer signal so that the characters will be properly distributed in the printer. The condenser voltages are transferred to the printer telegraph unit through the medium of gas-filled trigger tubes. These voltages are then preferably applied to a second distributor unit to the printer telegraph apparatus to operate the printer magnet if the proper combination of pulses is received. Preferably to the second distributor arrangement is coupled a start magnet to start the printer telegraph into operation. If two impulses are received then a character will be printed by operation of a printer magnet in the usual manner. If more than two significant marking pulses are received, then a marginal relay serves to operate the printer to a position to print an error indicating signal instead of any legible character. Because of the use of the nine unit code principle, it is very unlikely that any fortuitous combination of fading or interference will cause the printing of a character which is not correct. In almost every instance the printed character will either be correct or an identifiable error mark will be produced.

While we have outlined above certain objects and features of our invention, a better and more complete understanding of the invention as well as other objects and features thereof will be apparent from the particular description of an embodiment thereof made with reference to the accompanying drawings, in which.

Figure 1:
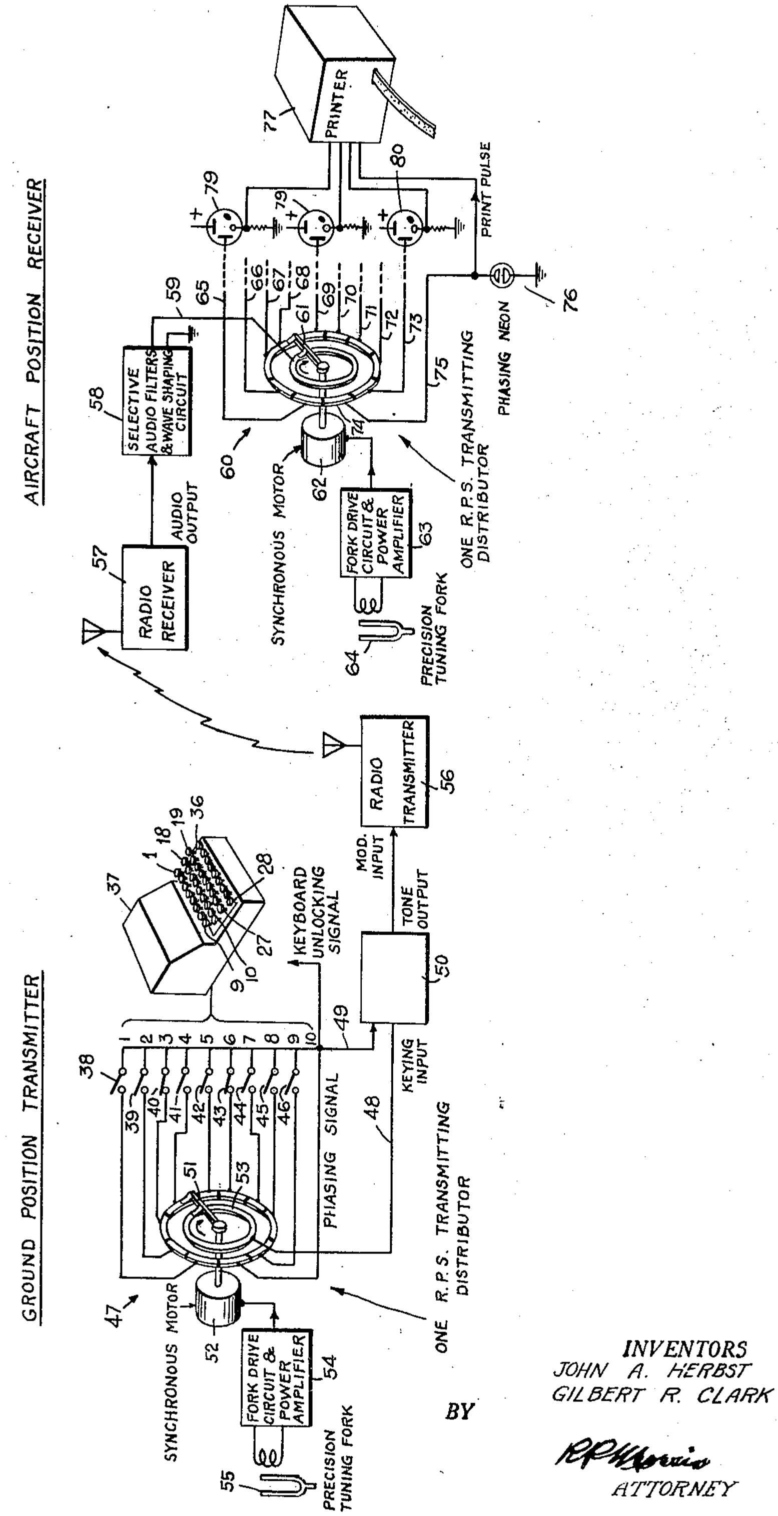
Fig. 1 is a diagram partially in block illustrating a nine unit transmitter-receiver apparatus.

Referring first to Fig. 1, a plurality of keys 1 to 36 inclusive, are shown printed on a telegraph keyboard transmitter 37. Keyboard 37 is so arranged that any two of switches 38 to 46 inclusive, are closed by operation of the keys. As shown, switches 40 and 43 are shown closed. Each of these switches in turn connects with a corresponding segment of transmitting distributor 47 and by lines 48 and 49 with a two-tone oscillator 50. Oscillator 50 is arranged so that when short circuit is established through lines 48 and 49 through the closed switches, a different tone frequency will be produced than when the switches are open. A distributor brush 51 is rotated by a synchronous motor 52 so as successively to connect the distributor segments of distributor 47 to the common continuous ring 53 to complete the circuit for the two-tone oscillator. In order that the motor be operated at the proper synchronous speed, a tuning fork drive power amplifier 54 synchronized in frequency by precision tuning fork 55 is provided. The tone signal generated in oscillator 50 is applied to modulate the radio frequency energy in radio transmitter 56 so that the energy may be transmitted to an associated receiver. The various combinations of tone frequencies representing selected characters are then transmitted from transmitter 56 to a radio receiver indicated generally at 57.

The received energy is detected at receiver 57 to reproduce the tone frequencies modulating the received energy. These tone frequencies are separated in a selective filtering circuit 58 and applied over a line 59 to receiving distributor 60. Receiving distributor brush 61 is rotated synchronously with the transmitter brush 51 so as to distribute the tone frequencies received to the various distributor segments. To assure synchronism of the distributor 60, a synchronous motor 62 is provided driven by a similar tuning fork arrangement 63 controlled by a precision tuning fork 64. By rotation of the receiving distributor in proper synchronous relation, the separate tone frequency signals are distributed over receiver lines 65 to 73 in the same relationship as they are transmitted. An additional synchronizing segment 74 is provided in distributor 60 coupled over line 75 to a phasing indicating tube 76 and to the printer mechanism 77. Likewise, the output lines from each of the receiver distributor segments are connected through individual gas-filled tubes, only three of which are shown at 78, 79 and 80 associated with lines 65, 69 and 73 respectively. These input signals are then applied to printer 77 to reproduce the desired character. The printer includes preferably certain mechanisms which will serve should incorrect numbers of marking signals be received to print an error indicating character instead of an erroneous character.

As previously explained, the use of the nine unit two-tone character code serves to provide unusually high accuracy in error detection since only two significant marking pulses are used for each character, whereas errors introduced by interference almost invariably cause the received signal to contain more than two significant marking pulses per character.

Figure 2:
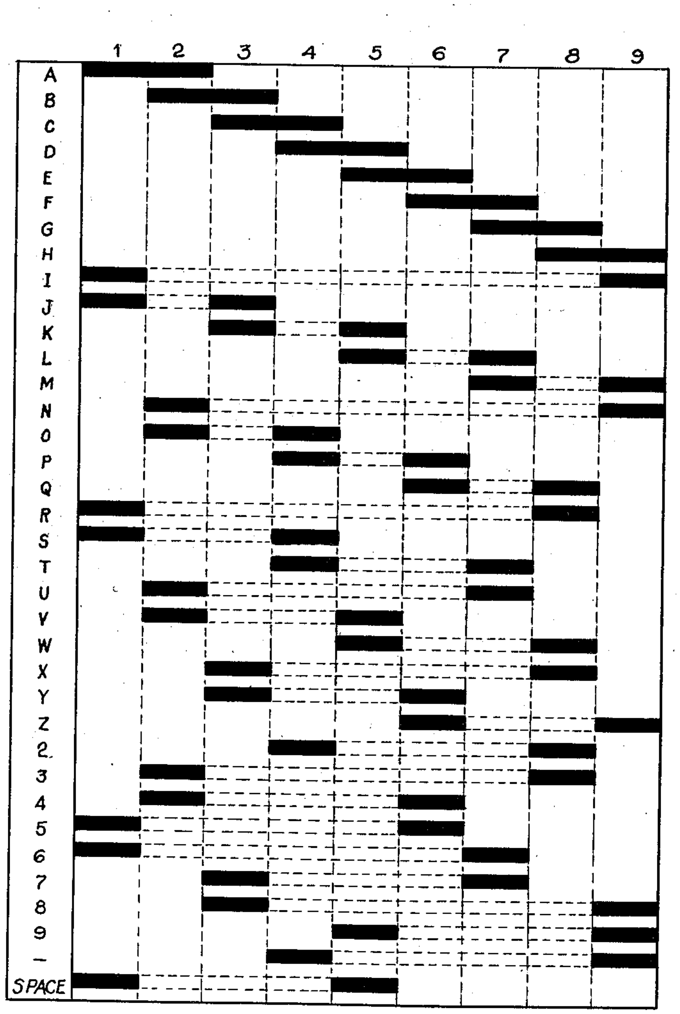
Fig. 2 is a chart illustrating the code of characters for use in a nine unit printer telegraph system.

As shown in Fig. 2, the black marks thereon indicate the time spacing allotted to the marking signals while the blanks therebetween for each character represents the other seven time divisions represented by the spacing signal. It will be seen from this arrangement, that thirty six combinations may be obtained with the nine unit code which is sufficient to cover the normal alphabet and digits as used for transmitting the signals. The two-tone form of bi-polar keying is used in this system in order to compensate for fading. With the two-tone or bi-polar keying it is possible to employ a differential device which will regenerate the signal according to whether a mark or a space is used regardless of the absolute magnitude. Thus, it will tend to overcome interference because the interference energy on the space tone frequency will generally equal the interference energy on the mark tone frequency, and the interference voltages thereby tend to balance each other out in the differential device. Whenever, a signal fades sufficiently, the differential device may be actuated by background noise. Therefore, the fading of the signal produces the same effect as an increase in interference. Thus, whenever severe fading or interference comes in to play, it will tend to produce as many marking as spacing intervals indicating an error in the machine instead of an erroneous character. While the bi-polar code is preferable from the fading control standpoint outlined above, it is clear that the principles of the nine-unit code for spacing and transmission apply as well to a uniform signal. While it is possible to use larger numbers than nine units, this, in general, is not practical since it will slow down the transmission rate by an amount unnecessarily large for the added gain in error-proofing of the system.

Turning now to the complete wiring diagram of the transmitter-receiver system shown in Figs. 3, 4, 5 and 6, the operation of the nine unit printer system in accordance with our invention will be more fully and clearly understood.

Figure 3:
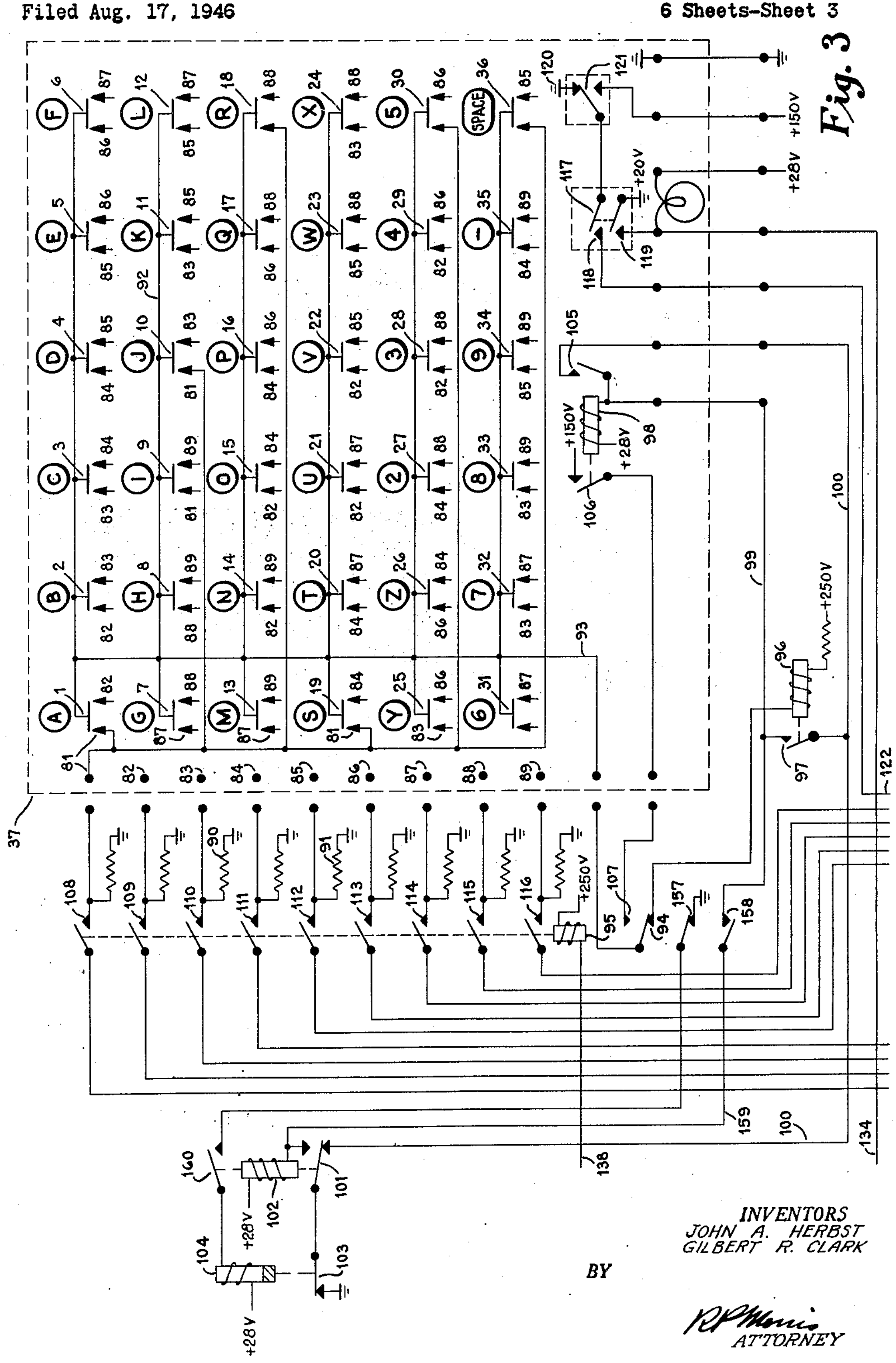
Figs. 3, 4, 5 and 6, arranged together as shown in Fig. 7, constitute a schematic wiring diagram of a transmitter-receiver printer telegraph unit in accordance with our invention.
Figures 4, 7:
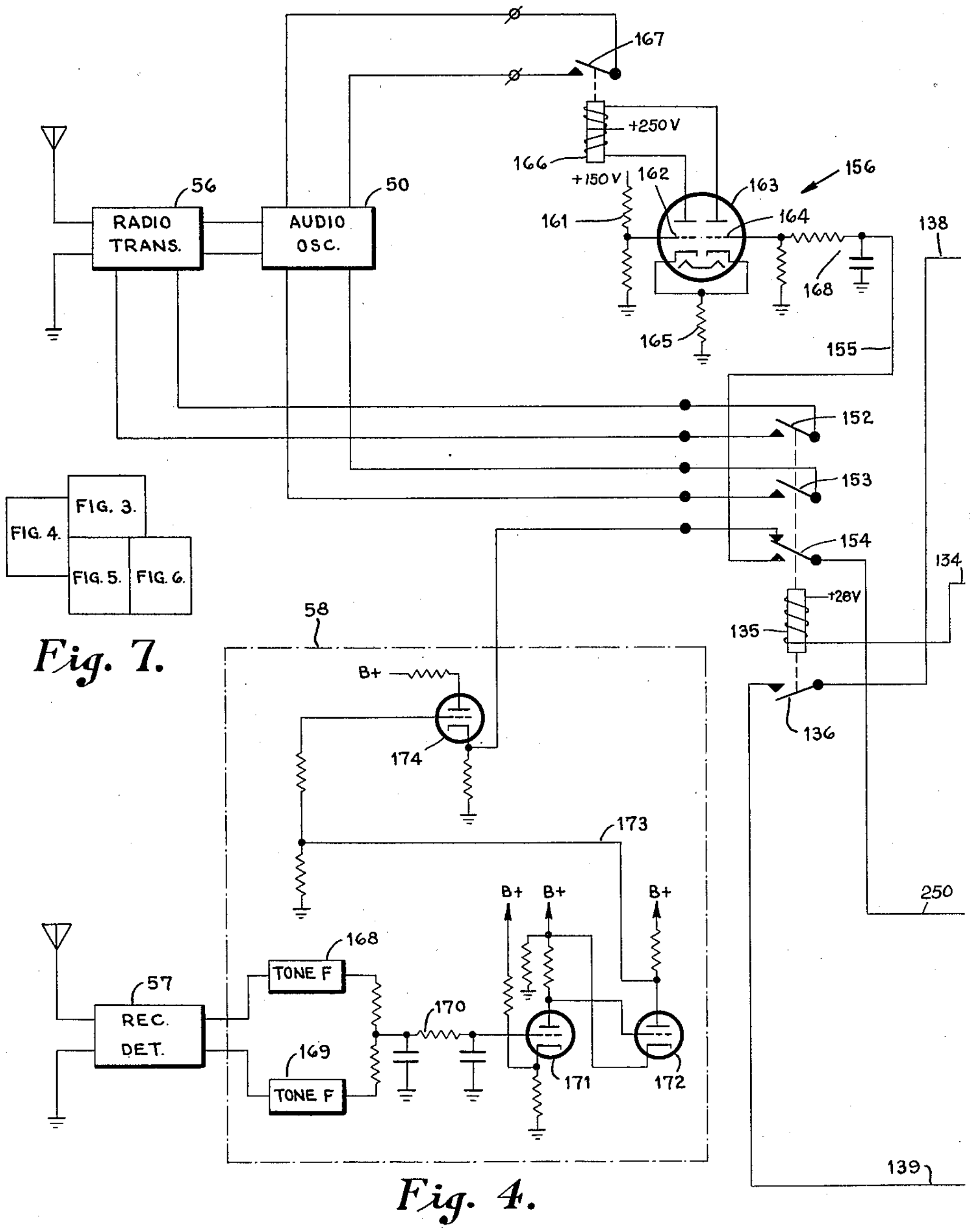

According to this arrangement, there are shown, in Fig. 3, nine terminals 81 to 89 inclusive, in keyboard 37. A plurality of keys 1 to 36 for covering the twenty-six alphabet letters and the numerical digits from 2 to 9 as well as a dash sign and a space key are provided. To describe the operation of the transmitter, it will be easiest to pick out some character and trace the transmission of this character throughout. We may take the letter "K," for example. It will be noted that when key 11 corresponding to the letter "K" is depressed connection is made to lines 83 and 85. In the keyboard illustration the numbers on the arrows below each key indicate which of the terminals 81 to 89 are connected by depression of that key only line 81 being shown completely for sake of illustration. This system is used in order to avoid the confusion of the many lines that otherwise would be necessary. Upon depression of key K, a circuit is established from ground through corresponding resistance elements 90 and 91 and through terminals 83 and 85 of key 11, line 92, line 93, contact 94 of relay 95, winding of relay 96 to positive battery causing relay 96 to operate to close its contact 97. Closure of contact 97 establishes a circuit from positive battery through the winding of relay 98, line 99, switch contact 97, line 100, switch contacts 101 of relay 102 and contact 103 of slow release relay 104 causing relay 98 to operate. Operation of relay 98 closes its contacts 105 and 106. Closure of contact 106 puts positive voltage on upper contact 107 associated with relay 95. Also the positive voltage from the source going through winding of relay 96 is supplied by way of key contacts 83 and 85 to the corresponding switch contacts 108 to 116 in the present example contacts 110 and 112. At the same time contact 106 was closed contact 105 establishes a holding circuit for relay 98 from positive battery winding of relay 98 through contact 105, line 100, contact 101, contact 103 to ground.

Figure 5:
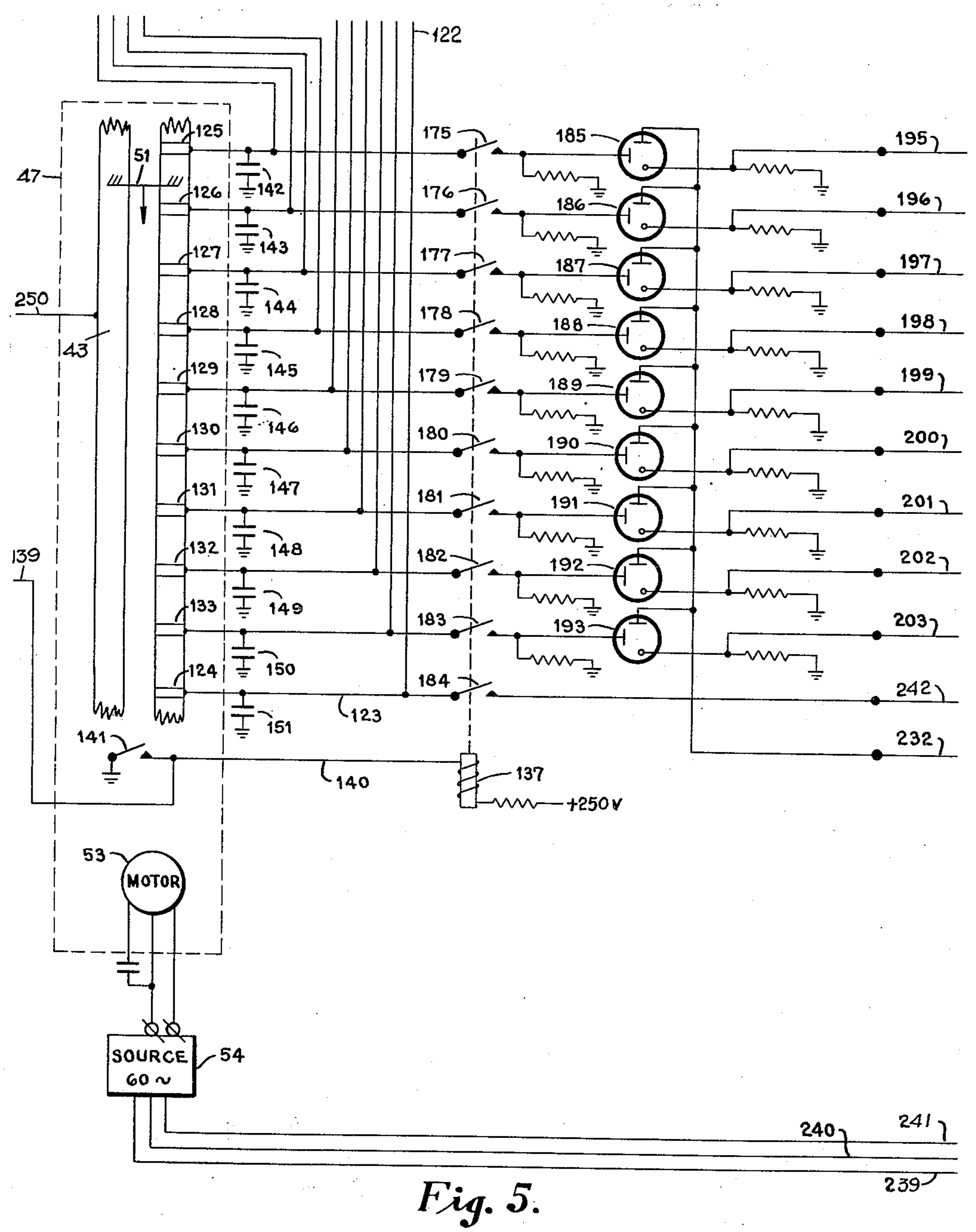
Figure 6:
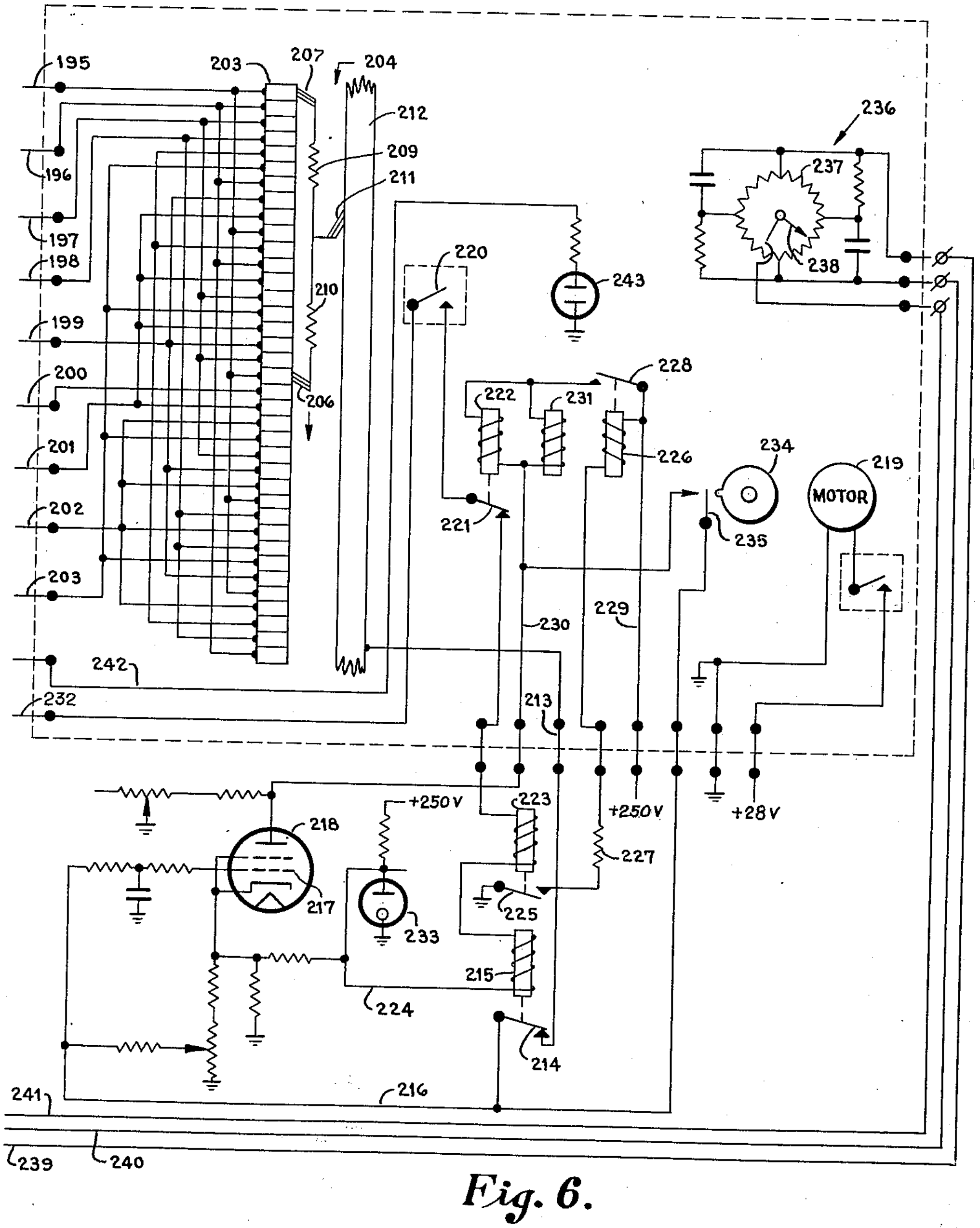

Before the key for transmitting was pressed, send-receive switch 117 is operated to close its contacts at 118 and 119. Closure at switch 118 establishes a circuit from ground at 120 through the off-phasing contact 121, contact 118, line 122, line 123 to a contact segment 124 on distributor 47 (Fig. 5). Distributor 47 carries, besides the tenth contact 124, nine other contacts 125 to 133 respectively. These contacts are connected also to be traversed sequentially by means of a brush 51. Closure of contact 119 prepares a circuit from ground through contact 119, line 134 through the windings of relay 135 (Fig. 4) causing this relay to operate to close its contact 136. Closure of contact 136 prepares a circuit for operation of relays 95 and 137 (Figs. 3 and 5) from positive source through the winding of 95, line 138, contact 136, line 139, line 140 to relay winding of relay 137 to positive battery. These relays do not yet operate though because of the positive voltage at each end of the circuit. When the brush 51 completes movement about distributor 47, it closes grounding switch 141 causing operation of relays 95 and 137. Operation of relay 95 closes the transfer switches 108 to 116 completing connections to storage condensers 142 to 151 causing the positive charges for the letter "K" on terminals 83 and 85 to be applied, to corresponding condensers 144 and 146. Closure of contacts 119 of sender switch 117, establishes a circuit for relay 135 from battery through the windings of 135, line 134, contacts 119 to ground. This operation of relay 135 (Fig. 4) changes the connections of the send-receiver equipment to the sending positions completing the circuit for the radio circuit transmitter 56 at contacts 152 for the audio oscillator 50 at 153 and at contacts 154 completing a circuit from the common bus bar 43 of distributor 47 over line 250 through contacts 154, line 155 to the sending relay circuit shown generally at 156. Relay 95 serves to apply the charges to the storage condensers 144 and 146 as previously described. As brush 51 passes over the separate distributor contacts, no voltage is supplied to relay circuit 156 until the energized contacts 144 and 146 are passed. In passing these contacts a positive voltage is applied to relay circuit 156. Thus the energy stored in the condensers 144 and 146 is caused to operate the keying apparatus to transmit marking pulses for these two periods identifying the letter "K."

Operation of relay 95 also serves to open contacts 157 and close its contacts 158. Closure of contacts 158 applies an operating voltage from ground on contact 103 of relay 104, contacts 101 of relay 102, lead 100, contacts 105 of relay 98, line 99, contacts 158, line 159 to the windings of relay 102. Energization of relay 102 causes it to close its contacts 101 at the lower front contacts thus maintaining ground potential for itself and relay 98 over contacts 101, line 159, switch 158 and line 99. When switch 141 again opens, relay 95 releases returning all of its contacts to normal. Reclosure of contacts 157 of relay 95 supplies ground through upper contacts 160 of relay 102, energizing slow release magnet 104 causing breaking of the ground contact at 103 thus releasing relay 102. Release of relay 95 also releases relay 98 by reopening contacts 158 which in turn removes the potential from the keyboard contacts by opening contacts 106. Relay 96 incidentally was released immediately when relay 95 operated moving its armatures from contact 94 to 107. Relay 104 is released by the release of relay 102. It is made slow to release to insure the release of relay 98 before restoring the ground to lead 100.

The operation of relay circuit 156 may be described as follows: A potential divider 161 supplies a positive bias to grid 162 of double triode 163. This bias is sufficient to maintain this half of double triode 163 in operation causing the other grid 164 to be maintained at a given negative bias by reason of the drop in resistor 165. A differential relay 166 is provided with a double winding and so arranged that when grid 162 is energized the relay will maintain contacts 167 open.

When the positive pulses from distributor 47 are applied to grid 164 over a time constant circuit 168, the other half of double triode 163 becomes conductive overcoming the bias produced in resistor 165. Thus the other half of the winding of relay 166 becomes energized causing the switch 167 to close for transmission of the marking pulse from audio oscillator 50. At the same time, the increased negative voltage developed across resistor 165 serves more quickly to cut off the first mentioned triode half of the tube 163 thus giving in effect an amplification of the voltage pulse applied for operation of the relay circuit 156 and causing very rapid operation thereof. Upon cessation of the signal, the relay 166 again returns to its normal position.

The received signals are detected in receiver-detector 57 and applied to the pulse shaping circuit 58. The circuit 58 contains tone filters 168 and 169 which serve to separate the marking and spacing tone frequencies derived from the detected and received signal. The tone filters 168 and 169 may contain the sharply tuned filter circuits plus amplifier tubes as desired. Also the tone filters preferably include rectifiers which serve to rectify the tone waves producing rectified voltages. These rectified voltages are applied over coupling network 170 to the grid of a first tube 171. Because of the differential combination of the output from filters 168 and 169, a voltage applied to the grid of tube 171 is either positive or negative depending upon whether the space or mark potential is the stronger. Tube 172 in cooperation with tube 171 serves as a D. C. limiter producing output energy at a constant low amplitude potential if the resultant voltage on the grid of tube 171 is even slightly negative and producing a constant high positive potential if the resultant on the grid of tube 171 is even slightly positive. Accordingly, the output at tube 172 produces a regeneration of the input signals according to which of the energies selected by the filters is the stronger regardless of the absolute magnitude of the voltage thus received. Because of the use of this limiter arrangement, the system is not critical as to the setting of output volume of radio receiver 57 nor is it affected by a reasonable fading or partial suppression of the desired tone frequencies. The output energy from tube 172 is fed over line 173 to the cathode-follower tube 174. Tube 174 thus presents a low impedance. On spacing signals the voltage is relatively low, for example, 60 volts, while on marking signals it is preferably of a value substantially double of that. These received voltages are then applied over switch 154 to the common ring 43 of distributor 47.

For receiving signals, the send-receive switch 117 is maintained in its open position as shown so that the keyboard transmitter is ineffective. The incoming signals are applied sequentially to distributor 47 in accordance with time of arrival over receiver 57 from the cathode of tube 174, over contact 154, line 250, ring 53, through brush 51 and segments 125—133 to the separate storage condensers 142 . . . 151. Assuming again that letter "K" is being received, storage condensers 144 and 146 would receive positive charges while the remaining condensers will have a low voltage or zero charge. When the distributor brush 51 has passed over all of the distributor contacts, it again closes switch 141 operating relay 137. Operation of relay 137 causes the closure of switches 175 to 184, respectively, transferring the charges from all of the condensers simultaneously to gas-discharge tubes 185 to 193, respectively. Only the tubes receiving a sufficiently positive charge will be fired. Consequently with our example wherein letter "K" is being received, only switches 177 and 179 will serve to transfer positive continuous pulses to tubes 187 and 189. The tubes act as translator means to convert the pulses into a D. C. potential. These positive potentials are applied over their respective lines 195 to 203, inclusive, to the corresponding contacts of the receiver translating distributor 204. The segment portions of 204 shown at 203 are so connected that if positive potential exists on a given combination of two of the leads the brushes 206, 207 will simultaneously contact two energized segments at one position on the distributor. At any other position, the brushes 206, 207 will contact either one or no energized leads. These two take-off brushes 206 and 207 are connected through individual resistors 209, 210 and a common brush 211 to the common bus 212 of distributor 204. With the letter "K" received then, when the brushes 206, 207 contact the proper segments associated with lines 197 and 199, a voltage will be applied over line 213, contacts 214 of relay 215, line 216 to the grid 217 of receiver thyratron 218 of sufficient magnitude to cause this tube to become conductive. The motor 219 drives the printing wheel (not shown), in synchronism with the rotatable distributor 204 so that the correct character is lined up with the printing magnet at the time the brushes 206 and 207 are feeling the particular pair of contacts corresponding to this letter.

When printing is to be effected, off-on switch 20 is closed and upon application of voltage from any of the thyratrons 185—193 energy will pass over a circuit from contacts 220, switch contacts 221 of print relay 222, winding of relay 223, winding of relay 215, line 224 to position battery. This current, due to one or more thyratrons, causes operation of relay 223 which closes its contacts 225 producing energization of start magnet 226 from positive voltage source, winding of relay 226, resistor 227, contacts 225 to ground. When relay 226 is energized, a catch (not shown) on the main shaft of the printer is released, thereby permitting motor 219 to drive distributor brushes 206, 207, 211 and the other related mechanism and closing contact 228 of relay 226. Accordingly, upon energization of relay tube 218, printing magnet 222 is energized from a positive source through line 229, switch 228 of start magnet 226, the windings of relay 222, line 230, tube 218 to ground. Also the stop magnet 231 is energized to stop the rotation of the printer wheel while the printing action is taking place.

It should be realized that since the lines 81 to 89 are in different combinations throughout, it is necessary that each voltage be applied to a number of different contacts in order to provide sufficient angular positions of brushes 206 and 207 to accommodate the number of different characters to be transmitted.

If the operation of relay 137 causes any of the thyratrons 185 to 193 to conduct, current will flow from ground through the associated cathode resistors to the anode of a conducting thyratron, through the common line 232, the contacts of the off-on switch 220, contacts 221 of print magnet 222, through the windings of relays 223 and 215 to positive 250-volt potential in the anode of voltage regulating tube 233. The total current through this circuit will depend on how many of the thyratrons 185 to 193 are energized. If one or more of the thyratrons are energized, relay 223 will operate, whose contacts 225 energize start magnet 226 releasing the catch (not shown) to allow the printer shaft to rotate, taking with it, as described above, the distributor brushes 206 and 207, the stop cam, the character print wheel and also the error cam 234.

If the transmitted letter has been received clearly, two of the thyratrons 185—193 will be energized. Consequently, brushes 206 and 207 in their rotation will find their position corresponding to the particular combination of two thyratrons fired and at that time energize the print and stop magnet as described above. The energization of the print magnet opens the circuit to the anodes of the thyratrons 185 . . . 193 at contact 221, extinguishing them and releases relay 223 which in turn releases the start magnet 226 so that at the end of a complete revolution of the printer shaft, the rotation will be arrested.

It will be noted that while, as shown, there are 36 characters corresponding to the 36 possible permutation of two out of nine signals, 37 positions have been provided to allow for an error indication. In other words, as will be described below, if more or less than two signals are received, the printer will operate to print a special symbol indicating that a mutilated character has been received.

Two types of mutilation are provided for, one in which less than two i. e. one signal is received, and the other in which more than two are received.

If only one signal is received, brushes 206 and 207 will never contact two energized segments and, consequently, tube 218 will not operate. Just before the end of the rotation, however, after the brushes 206 and 207 have scanned all of the possible positions representing character combinations, error cam 234 closes its contacts 235. The closure of these contacts connects positive potential through the contact 228 of start magnet 226 over lead 216 to grid 217 of thyratron 218 causing it to operate and energize the print and stop magnets 222 and 231. This stops the printer at the 37th position and causes it to print the error symbol.

If more than two signals are received, the increased current coming from the anodes of the thyratrons 185 to 193, passing through relay 215, causes it to operate. Relay 215, in other words, is marginated, operating only when the current is of the magnitude representing the firing of three or more of the thyratrons 185 to 193. Relay 215 operating, disconnects brushes 206 and 207 from the grid 217 of thyratron 218 by opening contacts 214, preventing its operation even though brushes 206 and 207 simultaneously contact energized segments. As above, the printer continues to rotate to the 37th position, at which point the error cam causes the error symbol to be printed.

It will be noted that in addition to serving as a receiver system, the storage condensers 142—151 may be used when transmitting to transfer the transmitted material to the same printer unit so that a copy of the message sent out will be printed at the same time. In this operation, the system performs its regular function in the same manner as described above.

Motor 52 is a synchronous motor which will operate to drive the distributor 47 synchronously in time. However, it is also necessary that phasing control of this motor be provided. For this purpose, the phasing network shown at 236 is provided. This network is provided with a potentiometer 237 and phase controlling circuit so that by clockwise or counter-clockwise rotation of contact arm 238 the phase of the energy supplied to the motor 52 from the energy source 54 may be accordingly advanced or retarded in like amount, one turn of the contact arm 238 corresponding to 360° shift. Lines 239, 240 and 241 show this connection. In order to secure this phasing, the transmitter phasing unit on the distant transmitter, for example, corresponding to the phasing switch 121, is moved to a lower position at the same time that the transmitter switch is moved into the send position. This applies directly a synchronizing potential to the tenth contact 124 of the distributor so that an impulse corresponding to the normal tenth position is transmitted. At the receiver this pulse is then applied over contact 124, condenser 151, line 123, contact 184 and line 242 to a glow lamp 243. By observing the flashing on and off of this lamp, the phase of the energy supplied to the driving motor 52 over the tuning fork circuit may be controlled until the receiving distributor is synchronized with the received signals. Thus a synchronization between the transmitter and the receiver may be readily obtained.

While we have described our invention with reference to a particular printer telegraph circuit and associated apparatus, various modifications and changes in parts and circuit arrangement will readily occur to those skilled in the art. It is to be distinctly understood that this illustration is given merely as illustrative of our invention and not as a limitation of the scope thereof.

We claim:

1. In a telegraph communication system wherein each character is represented by a predetermined combination of signals comprising recording means, transmission means comprising condenser storage means, said storage means adapted to be selectively charged in accordance with signal combinations received thereby, relay circuit means, distributor means coupled between said storage means and said relay circuit means whereby the charges stored in said storage means are transferred sequentially to said relay circuit means, and means under control of said distributor means for alternatively coupling said storage means to said recording means and said relay circuit means.

2. In a telegraph communication system as claimed in claim 1, wherein said recording means comprises translator means and printer means, said printer means under control of said translator means, and said means for alternatively coupling said storage means to said recording means comprises switch means, said switch means cooperating with said distributor means and operable by said distributor means at the termination of the distribution cycle thereof, whereby the charges stored in said storage means are transferred to said translator means.

3. A system according to claim 1, wherein said relay circuit means comprises two triode means, each of said triode means having an input circuit and an output circuit, means normally biasing one of said triode means to cut-off and the other into conductive condition, the input circuit of said normally cut-off triode presenting a high impedance to said storage means, means for applying the said storage charges from said distributor means to said normally blocked triode means to render it conductive, and a relay having separate windings one in each of the output circuits of said two triode means, said windings being adjusted to cause said relay to operate in response to the applied charges from said distributor means, said storage means adapted to retain the charges therein contained by reason of the high impedance presented thereto by said triode means.

4. In a telegraph communication system wherein each character is represented by a predetermined combination of signals, comprising recording means, a keyboard having a plurality of keys, each of said keys determining a combination of signals for each character to be transmitted, a plurality of condenser storage means, one of said condenser storage means for each element of said signal combination, said storage means adapted to be selectively charged in accordance with signal combinations associated with any actuated key of said keyboard, a distributor having a plurality of segments, each of said segments conductively connected to a different one of said storage means, relay circuit means under control of said distributor for alternatively coupling said storage means to said recording means and said relay circuit means at the termination of the distribution cycle of said distributor.

5. A system according to claim 4, further comprising signal receiving means, said recording means comprising translating means and printing means, switch means for selectively rendering said keyboard or said receiving means effective, means for applying to said distributor the signals received by said receiving means whereby said storage means are selectively charged in accordance with said received signals when said switch means render said receiving means effective, means for transferring to said translating means the charges stored in said storage means, said printing means adapted to operate under control of said translating means.

JOHN A. HERBST.
GILBERT R. CLARK.

REFERENCES CITED

The following references are of record in the file of this patent:

UNITED STATES PATENTS

| Number | Name | Date |
|---|---|---|
| 1,258,809 | Potts | Mar. 12, 1918 |
| 1,332,961 | Tanner | Mar. 9, 1920 |
| 1,332,976 | Dowd | Mar. 9, 1920 |
| 1,927,077 | Watson | Sept. 19, 1933 |
| 2,118,246 | Jutson | May 24, 1938 |
| 2,131,322 | Higgitt et al. | Sept. 27, 1938 |
| 2,153,737 | Spencer | Apr. 11, 1939 |
| 2,174,691 | Doty | Oct. 3, 1939 |
| 2,250,578 | Finch | July 29, 1941 |
| 2,387,536 | Simpson | Oct. 23, 1945 |